(12) United States Patent
Laine et al.

(10) Patent No.: US 8,515,448 B2
(45) Date of Patent: Aug. 20, 2013

(54) UPLOAD AND DOWNLOAD OF POSITION REFERENCE DATA

(75) Inventors: Tommi Antero Laine, Tampere (FI); Mikko Juhani Blomqvist, Tampere (FI); Lauri Aarne Johanns Wirola, Tampere (FI)

(73) Assignee: Nokia Corporation (FI)

( * ) Notice: Subject to any disclaimer, the term of this patent is extended or adjusted under 35 U.S.C. 154(b) by 0 days.

(21) Appl. No.: 13/122,855

(22) PCT Filed: Oct. 7, 2008

(86) PCT No.: PCT/EP2008/063416
§ 371 (c)(1), (2), (4) Date: Oct. 3, 2011

(87) PCT Pub. No.: WO2010/040392
PCT Pub. Date: Apr. 15, 2010

(65) Prior Publication Data
US 2012/0016626 A1    Jan. 19, 2012

(51) Int. Cl.
*H04W 88/02* (2009.01)
(52) U.S. Cl.
USPC ..................................... 455/456.1
(58) Field of Classification Search
USPC ............. 455/456.1, 456.3, 404.1, 411, 556.1; 342/357.29; 370/328; 726/2; 709/217
See application file for complete search history.

(56) References Cited

U.S. PATENT DOCUMENTS

| 5,999,947 A | 12/1999 | Zollinger et al. |
| 2001/0044309 A1 | 11/2001 | Bar et al. |
| 2006/0129607 A1 | 6/2006 | Sairo et al. |
| 2006/0240840 A1 | 10/2006 | Morgan et al. |
| 2006/0262011 A1 | 11/2006 | Bull et al. |
| 2008/0316042 A1 | 12/2008 | Scales |
| 2010/0069035 A1 | 3/2010 | Johnson |
| 2010/0201516 A1* | 8/2010 | Gelvin et al. ............ 340/539.26 |
| 2011/0212717 A1* | 9/2011 | Rhoads et al. ................ 455/420 |
| 2011/0294519 A1 | 12/2011 | Laine et al. |
| 2012/0190380 A1* | 7/2012 | Dupray et al. ............. 455/456.1 |

FOREIGN PATENT DOCUMENTS

| EP | 1 619 921 A1 | 1/2006 |
| GB | 2 359 699 A | 8/2001 |
| WO | WO 2008/080226 A1 | 7/2008 |

OTHER PUBLICATIONS

International Search Report for Application No. PCT/EP2008/063415 dated May 10, 2010.
International Search Report for International Application No. PCT/EP2008/063416, mailed Jul. 8, 2009.
International Preliminary Report on Patentability for International Application No. PCT/EP2008/063416, issued Apr. 12, 2011.

(Continued)

*Primary Examiner* — Diane Mizrahi
(74) *Attorney, Agent, or Firm* — Alston & Bird LLP

(57) ABSTRACT

An apparatus, a method and a computer program, the apparatus comprising: collection circuitry configured to collect position reference data, wherein the collected position reference data is for assisting another apparatus to determine a position of the another apparatus based upon wireless signals received by the another apparatus; receiver circuitry configured to receive control data relating to controlling the transmission of collected position reference data by the apparatus; transmitter circuitry configured to transmit collected position reference data; and processing circuitry configured, in dependence upon the received control data, to selectively control transmission of collected position reference data by the transmitter circuitry.

19 Claims, 10 Drawing Sheets

(56) References Cited

OTHER PUBLICATIONS

"3rd Generation Partnership Project; Technical Specification Group Radio Access Network; Stage 2 functional specification of User Equipment (UE) positioning in Utran (Release 7)"; 3GPP Draft; 25305-700, 3rd Generation Partnership Project (3GPP), Mobile Competence Centre ; 650, Route Des Lucioles ; F-06921 Sophia -Antipolis Cedex; France, vol. RAN WG2, no.; London, UK; 20050902, Jun. 30, 2005, XP050128898 sections. 4.3;4.3.2, 5.2.1.2. 1, 5.2.3; 5.2.4; 6.6.4.1.1; 6.6.4.1.3; 6.6.4.2; 6.6.5.1.1; 7.2; 7.3.2; 7.4.1; 7.4.2; 7.4.3; 9; 9.5; 9.6; 10.

Office Action for U.S. Appl. No. 13/122,863; dated Nov. 8, 2012.

Interview Summary for European Application No. 08805118.0; dated Jan. 29, 2013.

\* cited by examiner

UPLOAD AND DOWNLOAD OF POSITION REFERENCE DATA

FIELD OF THE INVENTION

Embodiments of the present invention relate to the upload and download of position reference data. In particular, they relate to the upload and download of position reference data relating to the position of communication access points.

BACKGROUND TO THE INVENTION

Many electronic apparatuses, such as mobile telephones, are configured to communicate with remote access points using radio frequency signals. If an electronic apparatus knows the location of a remote access point, it may calculate its absolute position by using the location of the access point and radio frequency signals that are received from the access point.

However, in many situations, an electronic apparatus is not able to calculate its absolute position because it does not know the location of the remote access point it is communicating with.

BRIEF DESCRIPTION OF VARIOUS EMBODIMENTS OF THE INVENTION

According to various, but not necessarily all, embodiments of the invention there is provided an apparatus, comprising: collection circuitry configured to collect position reference data, wherein the collected position reference data is for assisting another apparatus to determine a position of the another apparatus based upon wireless signals received by the another apparatus; receiver circuitry configured to receive control data relating to controlling collection of position reference data by the apparatus and/or transmission of collected position reference data by the apparatus; transmitter circuitry configured to transmit collected position reference data; and processing circuitry configured, in dependence upon the received control data, to control at least one of: collection of position reference data by the collection circuitry, and transmission, by the transmitter circuitry, of position reference data collected by the collection circuitry.

According to various, but not necessarily all, embodiments of the invention there is provided a method, comprising: enabling reception, at an apparatus, of control data relating to controlling collection of position reference data by the apparatus and/or transmission of collected position reference data by the apparatus, the position reference data being for assisting another apparatus to determine a position of the another apparatus based upon wireless signals received by the another apparatus; and enabling, in dependence upon the received control data, control of at least one of: collection of position reference data by the apparatus, and transmission, by the apparatus, of collected position reference data.

According to various, but not necessarily all, embodiments of the invention there is provided a computer program, comprising: instructions for enabling an apparatus to receive control data, the received control data relating to controlling collection of position reference data by the apparatus and/or transmission of collected position reference data by the apparatus, the position reference data being for assisting another apparatus to determine a position of the another apparatus based upon wireless signals received by the another apparatus; and instructions for enabling, in dependence upon the received control data, control of at least one of: collection of position reference data by the apparatus, and transmission, by the apparatus, of collected position reference data.

According to various, but not necessarily all, embodiments of the invention there is provided an apparatus, comprising: means for collecting position reference data, wherein the collected position reference data is for assisting another apparatus to determine a position of the another apparatus based upon wireless signals received by the another apparatus; means for receiving control data relating to controlling collection of position reference data by the apparatus and/or transmission of collected position reference data by the apparatus; means for transmitting collected position reference data; and means for controlling at least one of: collection of position reference data by the means for collecting, and transmission, by the means for transmitting, of position reference data collected by the means for collecting.

According to various, but not necessarily all, embodiments of the invention there is provided an apparatus, comprising: collection circuitry configured to collect position reference data, wherein the position reference data is for assisting another apparatus to determine a position of the another apparatus based upon wireless signals received by the another apparatus; positioning circuitry configured to determine a position of the apparatus; transceiver circuitry configured to transmit, to a remote location, position information indicating a position of the apparatus, and configured to receive, in reply, control data, wherein the control data relates to: controlling collection of position reference data, when the apparatus is at the indicated position, and/or transmission of collected position reference data by the apparatus, when the apparatus is at the indicated position; and processing circuitry configured, in dependence upon the received control data, to control at least one of: collection of position reference data by the collection circuitry, and transmission, by the transceiver circuitry, of position reference data collected by the collection circuitry.

According to various, but not necessarily all, embodiments of the invention there is provided an apparatus, comprising: processing circuitry, configured to enable a transmitter to transmit control data to a plurality of further apparatuses, each further apparatus being at a remote location from the apparatus, the control data relating to the collection and/or transmission of position reference data by the further apparatuses, and wherein position reference data is for assisting another apparatus, different to the apparatus, to determine a position of the another apparatus based upon wireless signals received by the another apparatus.

According to various, but not necessarily all, embodiments of the invention there is provided a method, comprising: enabling an apparatus to transmit, to a plurality of further apparatuses, control data, each further apparatus being at a remote location from the apparatus, the control data relating to collection and/or transmission of position reference data by the further apparatuses, and wherein position reference data is for assisting another apparatus, different to the apparatus transmitting position reference data, to determine a position of the another apparatus based upon wireless signals received by the another apparatus.

According to various, but not necessarily all, embodiments of the invention there is provided a computer program, comprising: instructions for enabling an apparatus to transmit control data, to a plurality of further apparatuses, each further apparatus being at a remote location from the apparatus, the control data relating to collection and/or transmission of position reference data by the further apparatuses, and wherein position reference data is for assisting another apparatus, different to the apparatus transmitting position reference data, to determine a position of the another apparatus based upon wireless signals received by the another apparatus.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
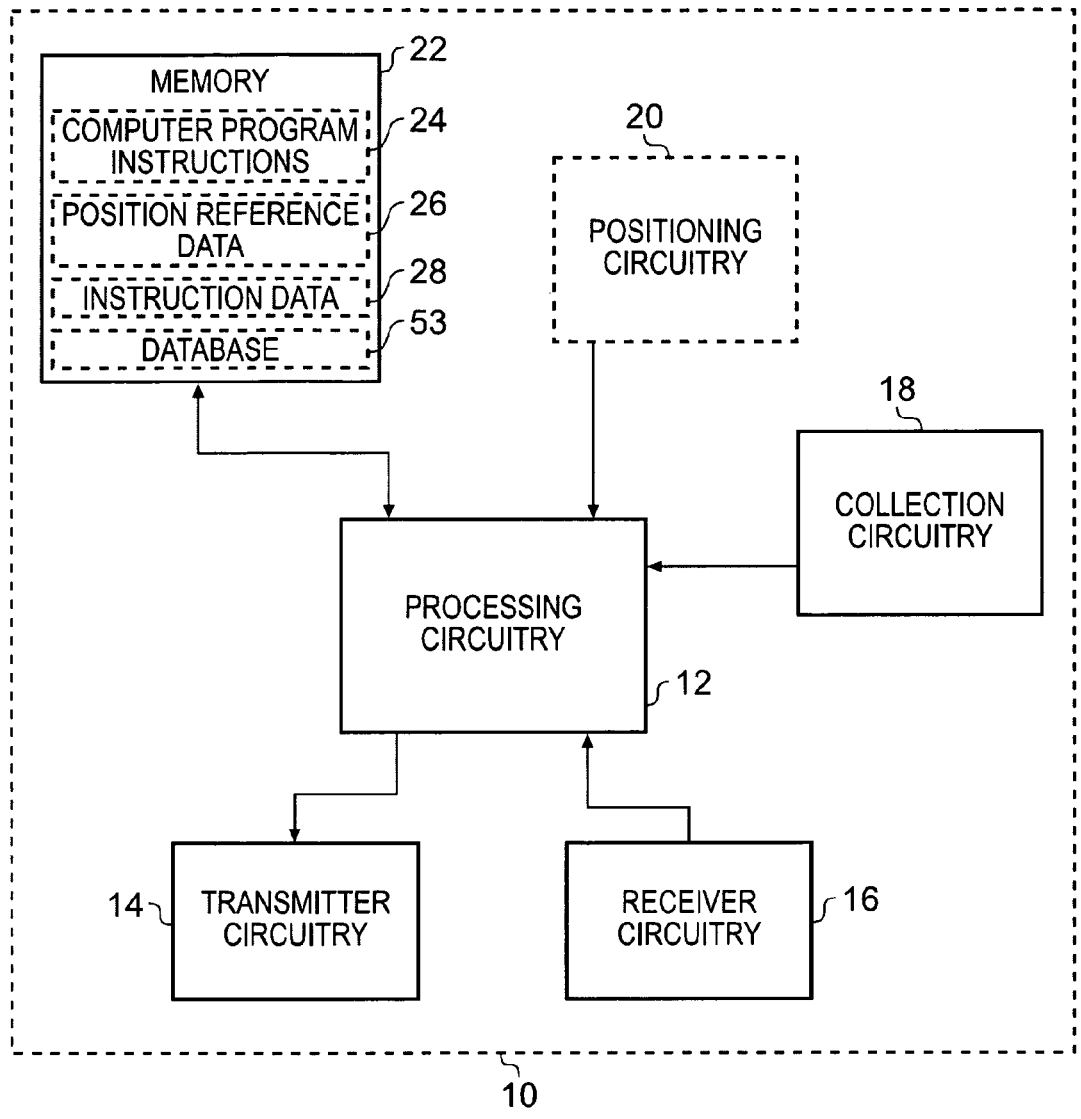
FIG. 1 illustrates a schematic of an apparatus.
Figure 1:
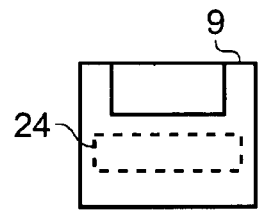

The Figures illustrate an apparatus 10, comprising: collection circuitry 18 configured to collect position reference data 26, wherein the collected position reference data 26 is for assisting another apparatus to determine a position of the another apparatus based upon wireless signals received by the another apparatus; receiver circuitry 16 configured to receive control data 28/53 relating to controlling collection and/or transmission of position reference data 26 by the apparatus 10; transmitter circuitry 14 configured to wirelessly transmit collected position reference data 26; and processing circuitry 12 configured, in dependence upon the received control data 28/53, to control at least one of: collection of position reference data 26 by the collection circuitry 18, and transmission, by the transmitter circuitry 14, of position reference data 26 collected by the collection circuitry 18.

FIG. 1 illustrates an apparatus 10. The apparatus 10 may be, for example, a hand portable electronic apparatus such a mobile telephone, a personal digital assistant or a personal music player. The apparatus 10 comprises processing circuitry 12, transmitter circuitry 14, receiver circuitry 16, collection circuitry 18 and a memory 22. Optionally, the apparatus 10 may comprise positioning circuitry 20.

The processing circuitry 12 is configured to receive an input from the receiver circuitry 16, the collection circuitry 18 and the positioning circuitry 20. The processing circuitry 12 is also configured to provide an output to the transmitter circuitry 14, and to read from and write to the memory 22. The processing circuitry 12 is operationally coupled to the each element of circuitry 14, 16, 18, 20 and 22 and any number or combination of intervening elements can exist (including no intervening elements).

The transmitter circuitry 14 may be configured to transmit wireless signals such as radio frequency signals and the receiver circuitry 16 may be configured to receive wireless signals such as radio frequency signals. In some embodiments of the invention, the transmitter circuitry 14 and the receiver circuitry 16 may form transceiver circuitry. The transmitter circuitry 14 and the receiver circuitry 16 may share some or all components.

In some embodiments of the invention, the transmitter circuitry 14 and the receiver circuitry 16 may be configured to communicate using short range radio frequency signals, such as signals in accordance with a 802.11 wireless local area network (WLAN/WiFi Alliance) protocol, a WiMax protocol, a Bluetooth protocol, an ultra low power Bluetooth protocol, or protocols relating to UWB or Zigbee technologies.

In these embodiments, the short range radio signals may, for example, have a transmission range of 100 meters or less. In some of these embodiments of the invention, the short range radio signals may, for instance, have a transmission range of 10 meters or less.

In other embodiments of the invention, the transmitter circuitry 14 and the receiver circuitry 16 may be configured to communicate using long range radio frequency signals. For example, they may be configured to communicate in a cellular network using long range radio frequency signals. For example, the cellular network may operate according to one or more of the GSM, UMTS, IS-95 or CDMA 2000 protocols. Long range radio frequency signals may, for example, have a transmission range of up to around 3 to 5 miles.

It should be understood that the transmitter circuitry 14 and the receiver circuitry 16 may or may not operate in accordance with the same protocol. For example, in some embodiments of the invention, the transmitter circuitry 14 may be configured to transmit long range radio frequency signals and the receiver circuitry 16 may be configured to receive short range radio frequency signals.

The positioning circuitry 20 is configured to determine a position of the apparatus 10. For example, in some embodiments of the invention, it may be a satellite positioning receiver. In an alternative implementation, it may be a receiver that is configured to operate in a cellular telephone network that can determine a position of the apparatus 10 using received cellular signals. For example, the positioning circuitry 20 may share some or all of its components with the receiver circuitry 16.

The term "satellite positioning receiver" is considered to relate to any type of satellite positioning system. The satellite positioning receiver may be configured to receive positioning information from a plurality of satellites and to determine a position of the apparatus 10 using the received positioning information. For example, the satellite positioning receiver may be configured to receive positioning information from one, some or all of the following satellite constellations: the Global Positioning System (GPS), the Russian system GLONASS and the proposed European positioning system Galileo.

The satellite positioning receiver may also be configured to operate in accordance with one or more satellite based augmentation systems, such as: the Wide Area Augmentation System (WAAS), the European Geostationary Navigation Overlay Service (EGNOS), the Multi-functional Satellite Augmentation System (MSAS) or the GPS Aided Geo Augmented Navigation (GAGAN).

The collection circuitry 18 is configured to collect position reference data 26 from one or more remote communication access points. Each remote communication access point may enable the apparatus 10 to communicate with further remote apparatuses by providing an onward communication path to those further remote apparatuses. For example, in some embodiments of the invention, the communication access points may enable the apparatus 10 to connect to the internet.

The collection circuitry 18 may be configured to collect position reference data by scanning for long or short range radio signals and receiving long or short range radio signals. In some embodiments, the collection circuitry 18 is configured to scan for and receive radio signals such as signals in accordance with a WLAN/WiFi Alliance protocol, a WiMax protocol, a Bluetooth protocol, an ultra low power Bluetooth protocol, or with protocols relating to UWB or Zigbee technologies. In other embodiments, the collection circuitry 18 is configured to scan for and receive long range radio signals, such as signals in accordance with one or more of the GSM, UMTS, IS-95 or CDMA 2000 protocols.

The collection circuitry 18 may share some or all of its components with the receiver circuitry 16.

Figure 3:
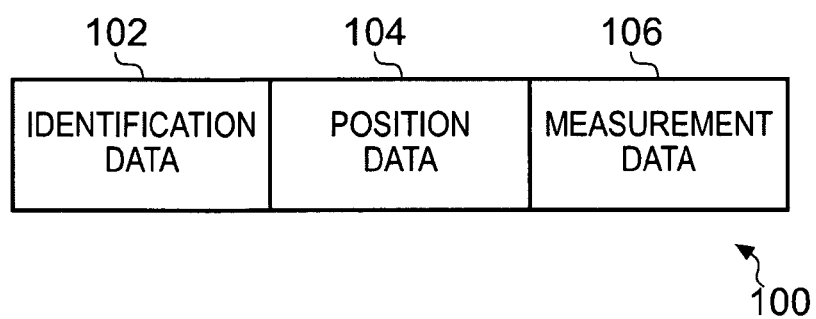
FIG. 3 illustrates a portion of position reference data.

Position reference data 26 enables the location of communication access points to be determined. An example of a portion 100 of position reference data 26 collected by the collection circuitry 18 is given in FIG. 3. The illustrated portion 100 relates to a single communication access point. In this example, the portion 100 of position reference data 26 includes identification data 102, position data 104 and measurement data 106. In other examples, a portion of position reference data 26 may not include measurement data 106.

The identification data 102 indicates an identification code of a communication access point. This may have been included in a radio signal transmitted by a communication access point. The position data 104 and the measurement data 106 together provide an indication of the location of the transmitting communication access point. The position data 104 indicates a position at which the collection circuitry 18 received a radio signal transmitted from the communication access point. The position of the apparatus 10 may be determined, for example, using the positioning circuitry 20. For example, the indicated position may be an exact geographical location given by latitude and longitude measurements determined by a satellite positioning receiver. Alternatively, the indicated position may be a geographical area (e.g. a geographical area indicated by a code relating to a particular cellular network cell or cells).

The measurement data 106 indicates where the communication access point is located with respect to the position of the apparatus 10. For example, in some embodiments, the measurement data 106 may indicate the location of the communication access point by indicating a distance and a direction of the communication access point relative to the position of the apparatus 10. In other embodiments, only a relative distance may be indicated by the measurement data 106. In these embodiments, the relative distance indicates the location of the communication access point by identifying an area in which the communication access point is located.

For example, in some embodiments of the invention, the collection circuitry 18 obtains the measurement data 106 by measuring the received signal strength intensity (RSSI) of a radio signal transmitted by the communication access point. It may also measure the direction from which the radio signal was received using a directional antenna.

The manner in which the collection circuitry 18 obtains the measurement data 106 may depend upon the type of the radio signal that is being scanned for and received by the collection circuitry 18.

In situations where the position reference data 26 does not include measurement data 106, it may be possible to deduce the location of the transmitting communication access point by using the position data 104 and some other known property of signals transmitted by the communication access point. For example, if it is known that a communication access point transmits signals with a certain transmission power and the position data 104 indicates a position at which the collection circuitry 18 received a radio signal transmitted from the communication access point, an area in which the communication access point is located can be determined.

It will be apparent to those skilled in the art that an alternative name for a portion 100 of position reference data 26 is a "fingerprint". A database of fingerprints (or a database information derived from fingerprints or by using fingerprints) is known as a "radiomap".

If a fingerprint/radiomap relating to one or more communication access points is provided to an apparatus, the apparatus can determine its own position by receiving a radio signal from one or more of the communication access points and using the fingerprint/radiomap as a reference.

The memory 22 of the apparatus 10 may store computer program instructions 24, collected position reference data 26, a database 53 of position reference data 26 and instruction data 28. The database 53 of position reference data 26 and/or the instruction data 28 may be considered to be "control data". This is explained in more detail below.

Although the memory 22 is illustrated as a single component it may be implemented as one or more separate components some or all of which may be integrated/removable and/or may provide permanent/semi-permanent/dynamic/cached storage.

Implementation of the processing circuitry 12 can be in hardware alone, have certain aspects in software including firmware alone or can be a combination of hardware and software (including firmware).

The processing circuitry 12 may operate using instructions that enable hardware functionality, for example, by using executable computer program instructions that may be stored on a tangible computer readable storage medium (e.g. disk, memory etc).

The computer program instructions 24 stored in the memory 22 control the operation of the apparatus 10 when loaded into the processing circuitry 12. The computer program instructions 24 provide the logic and routines that enable the apparatus 10 to perform the methods illustrated in FIGS. 2, 5, 6, 7 and 8. The processing circuitry 12 is, by reading the memory 22, able to load and execute the computer program instructions 24.

The computer program instructions 24 provide: instructions for enabling an apparatus 10 to receive control data 28/53, the received control data 28/53 relating to controlling collection and/or transmission of position reference data 26 by the apparatus 10, the position reference data 26 being for assisting another apparatus to determine a position of the another apparatus based upon wireless signals received by the another apparatus; and instructions for enabling, in dependence upon the received control data 28/53, control of at least one of: collection of position reference data 26 by the apparatus 10, and transmission, by the apparatus 10, of collected position reference data 26

The computer program instructions 24 may arrive at the apparatus 10 via any suitable delivery mechanism 9. The delivery mechanism 9 may be, for example, a computer-readable storage medium, a computer program product, a memory device, a record medium such as a CD-ROM or DVD, an article of manufacture that tangibly embodies the computer program 24. The delivery mechanism 9 may be a signal configured to reliably transfer the computer program 24. The apparatus 10 may propagate or transmit the computer program 24 as a computer data signal.

References to 'computer-readable storage medium', 'computer program product', 'tangibly embodied computer program' etc. or 'processor' and 'processing circuitry' etc. should be understood to encompass not only computers having different architectures such as single/multi-processor architectures and sequential (e.g. Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

A first method of controlling collection and/or upload of position reference data 26 by an apparatus 10 will now be described in relation to FIG. 2.

Figure 2:
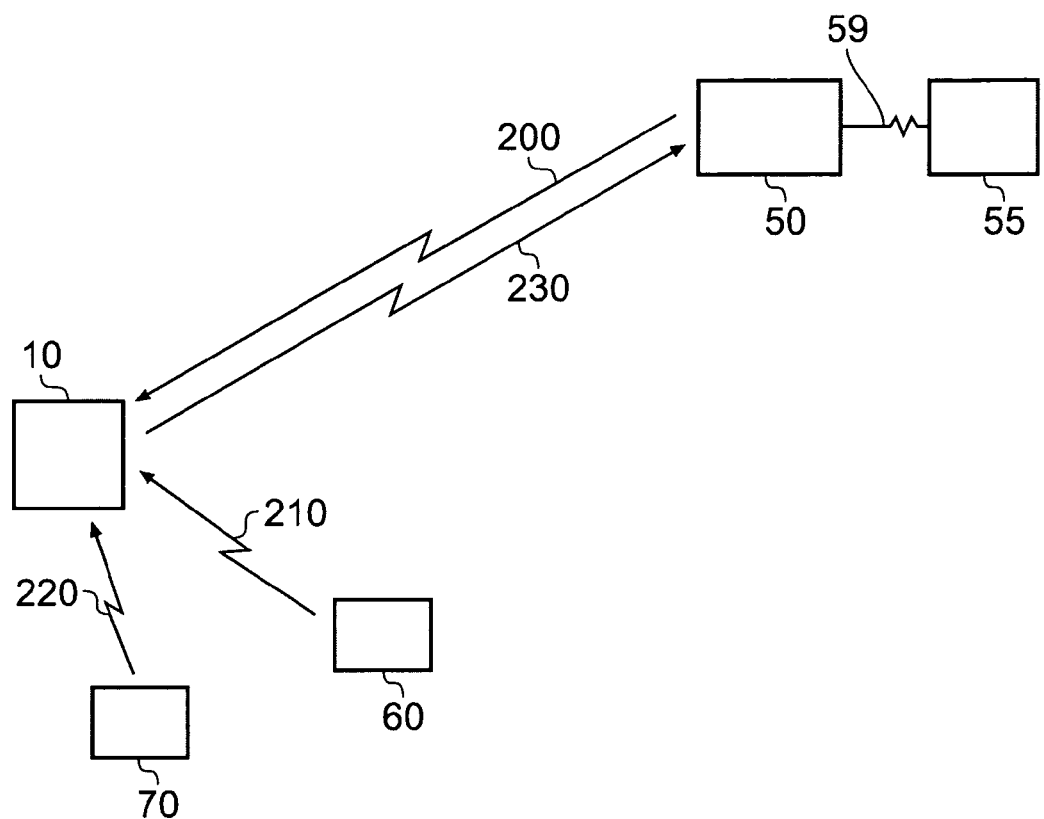
FIG. 2 illustrates communication between apparatuses.

FIG. 2 illustrates a first apparatus 10 communicating directly with second, third and fourth apparatuses 50, 60, 70, and indirectly with a fifth apparatus 55 (i.e. via the second apparatus 50).

The first apparatus 10 has the same form as that described above in relation to FIG. 1. For clarity, hereinafter the first apparatus 10 will be referred to as a mobile apparatus.

The second, third and fourth apparatuses 50, 60, 70 are communication access points. The communication access points 50, 60, 70 may be configured to transmit and receive long and/or short range radio signals. Each communication access point 50, 60, 70 may, for example, enable an apparatus connected to it to communicate with further remote apparatuses via an onward communication path. For instance, in some embodiments of the invention, some or all of the communication access points may enable the mobile apparatus 10 to connect to the internet. The second, third and fourth apparatuses 50, 60, 70 may have a fixed position or be movable (e.g. hand portable).

The second, third and fourth communication access points 50, 60, 70 may operate in accordance with the same or different protocols. For example, they may operate in accordance with a WLAN/WiFi Alliance protocol, a WiMax protocol, a Bluetooth protocol, an ultra low power Bluetooth protocol, protocols related to UWB or Zigbee technologies, or a cellular protocol such as GSM, UMTS, IS-95 or CDMA 2000.

For clarity, hereinafter the third and fourth communication access points 60, 70 will be referred to as WLAN access points.

In some embodiments of the invention, the second apparatus 50 may be configured to communicate with the first apparatus 10 using a wired connection.

The second apparatus 50 is connected to a fifth apparatus 55 via a communication link 59. The fifth apparatus 55 may be a server that is remote from the second apparatus 50. For clarity, hereinafter the fifth apparatus 55 will be referred to as a server.

Any number of intervening elements may be present between the fifth apparatus 50 and the server 55 (including no intervening elements). The communication link 59 may a wired communication link, a wireless communication link, or a combination of the two.

In the illustrated embodiment, the second apparatus 50 is a communication access point for that enables the mobile apparatus 10 to communicate in a cellular network. For example, it may be a cellular base station. For clarity, hereinafter the second apparatus 50 will be referred to as a cellular base station.

The mobile apparatus 10 may communicate with the server 55 using IP data packets. While the mobile apparatus 10 communicates with the cellular base station 50 at a physical level, the cellular base station 50 may be considered to be transparent to the type of data that is being transmitted at a network level. In other words, the cellular base station 50 may merely act as a routing node for forwarding data from the mobile apparatus 10 to the server 55, or from the server 55 to the mobile apparatus 10.

In the first method, the receiver circuitry 16 of the mobile apparatus 10 receives control data 28/53 from the server 55. The example illustrated in FIG. 1 shows the control data 28/53 being physically provided to the mobile apparatus 10 by the cellular base station 50 in the form of a radio signal 200. The control data 28/53 indicates to the mobile apparatus 10 the manner in which it should collect position reference data 26 from the WLAN access points 60, 70 and/or transmit collected position reference data 26 to the server 55.

According to one example of the first method, the control data 28/53 indicates to the mobile apparatus 10 the manner in which it should collect position reference data 26 from WLAN access points. The indication may be explicit or implicit. The processing circuitry 12 of the mobile apparatus 10 controls the way in which collection circuitry 18 collects position reference data 26, in dependence upon the analysis.

In this example, the mobile apparatus 10 only collects position reference data 26 in accordance with the control data. For instance, the control data 28/53 may explicitly or implicitly indicate any of the following to the apparatus 10: one or more geographical areas in which to collect position reference data 26, a time or time period at which to collect position reference data 26, a frequency at which to collect position reference data 26 or a desired property for collected position reference data 26.

FIG. 2 illustrates the mobile apparatus 10 collecting portions 100 of position reference data 26 from the WLAN access points 60, 70 by scanning for radio signals 210, 220 transmitted by the WLAN access points 60, 70 and then subsequently receiving and using those radio signals 210, 220.

Once appropriate position reference data 26 has been collected by the mobile apparatus 10, the processing circuitry 12 of the mobile apparatus 10 controls the transmitter circuitry 14 to transmit the collected position reference data 26 to the server 55. The server 55 then stores the position reference data 26 in a database 53. The illustrated example shows a radio signal 230 including the position reference data 26 being physically transmitted to the cellular base station 50.

The transmission of position reference data 26 by the mobile apparatus 10 is "selectively controlled" in this example by controlling the way in which position reference data 26 is collected by the mobile apparatus 10 for subsequent transmission.

The position reference data 26 that is transmitted to the server 55 by the mobile apparatus 10 may or may not be embedded in other types of data that is transmitted by the mobile apparatus 10.

In some embodiments of the invention, every portion 100 of position reference data 26 which has been collected by the mobile apparatus 10 following reception and analysis of the control data is transmitted to the server 55. In other embodiments, every portion 100 of collected position reference data 26 is not transmitted to the server 55.

In order to aid explanation of embodiments of the invention, FIG. 2 only illustrates a single mobile apparatus 10, a single cellular base station 50 and two WLAN access points 60, 70. However, it should be understood that, in practice, the server 55 may provide control data 28/53 to a large number of apparatuses (e.g. thousands of mobile apparatuses) via, for instance, a large number of cellular base stations. The control data provided to a mobile apparatus need not be unique to that particular mobile apparatus (e.g. the same control data 28/53 may be sent to a number of mobile apparatuses). There may also be large number of WLAN access points.

Thus, the server may build up a database 53 of position reference data 26 by using receiving position reference data from a community of apparatuses.

As the server's database 53 of position reference data 26 is built up, it may become apparent that more position reference data 26 is being acquired in certain geographical areas than others. The above method enables the server 55 to use control data to control apparatuses in certain geographical regions to collect and transmit position reference data more frequently, enabling it to modify the database 53 by filling in the gaps in the database 53.

Also, the server 55 is able to reduce the load on the cellular network by determining which geographical regions the database 53 has an adequate amount of position reference data for, and controlling the apparatuses in those regions to collect and transmit position reference data less frequently.

Many of the communication access points represented in the database 53 may have a fixed location. The server 53 may take steps to improve the quality of the position reference data 26 relating to these fixed communication points over time. This may be done, for example, by indicating a desired property for future position reference data 26 that is sent to it for a particular geographical area (e.g. by specifying that future position reference data 26 for a particular geographical area must include position data that indicates a position determined by a satellite positioning receiver).

The location of some communication access points may change over time. The server 55 may update the position reference data 26 relating to these access points using information received from the community of apparatuses.

In an alternative example of the first method, the control data 28/53 does not indicate to the mobile apparatus 10 the manner in which it should collect position reference data 26 from WLAN access points. Instead, the control data 28/53 may explicitly or implicitly indicate to the mobile apparatus 10 the circumstances under which collected position reference data 26 is to be transmitted to the server 55. For example, the control data 28/53 may indicate: one or more geographical areas in which to transmit collected position reference data 26, a time or time period at which to transmit collected position reference data 26, a frequency at which to transmit collected position reference data 26 or a desired property for transmitted position reference data 26.

The transmission of position reference data 26 by the mobile apparatus 10 is "selectively controlled" in this alternative example by controlling the way in which collected position reference data 26 is transmitted by the mobile apparatus 10.

The collection circuitry 18 may collect position reference data 18 whenever it is operational, or, alternatively, in accordance with a settings applied by a user. However, only some of the collected position reference data 26 may be transmitted to the server 55 by the mobile apparatus 10.

Figure 4:
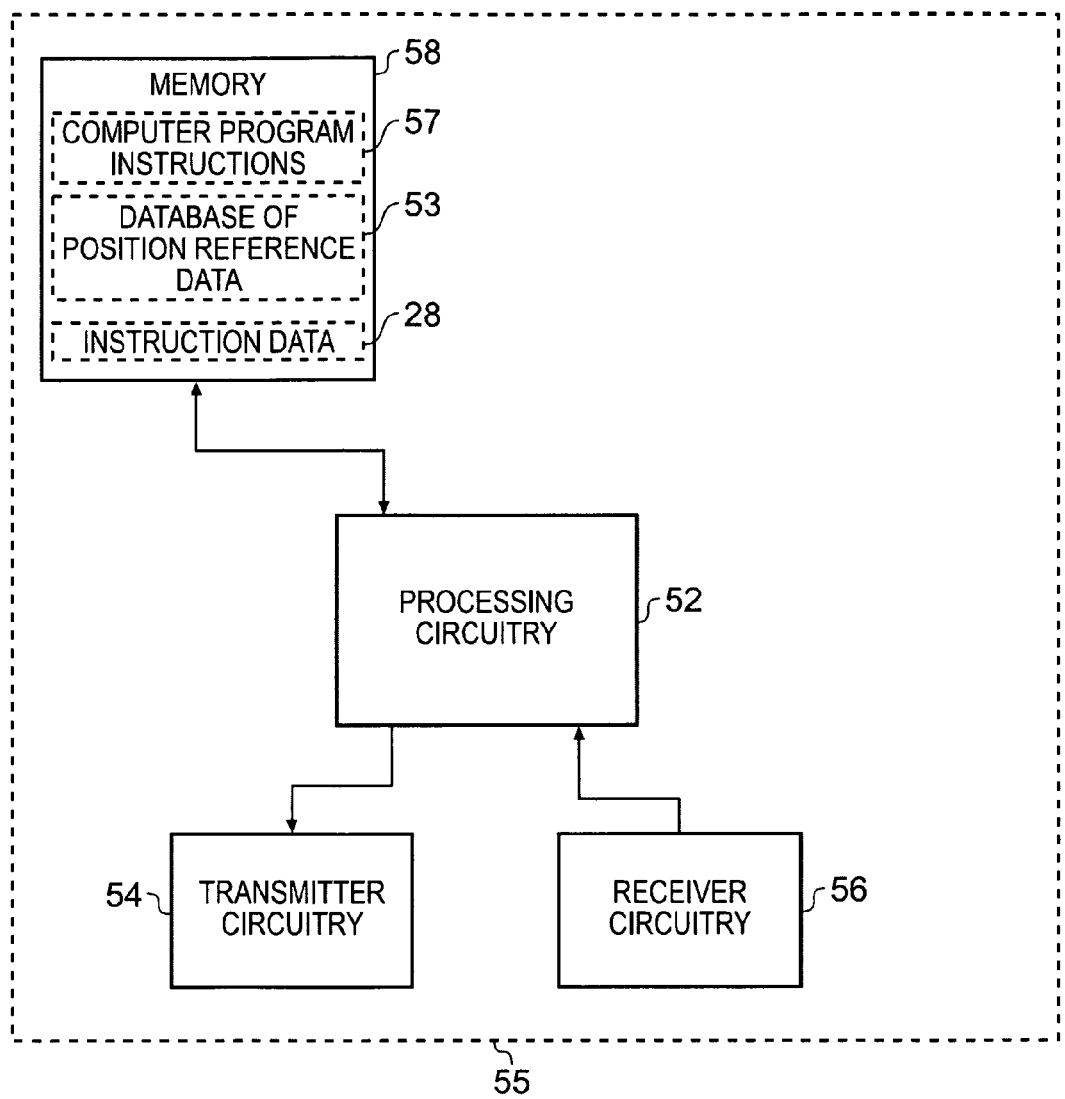
FIG. 4 illustrates a schematic of a server.
Figure 4:
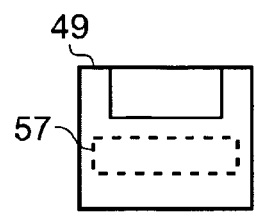

FIG. 4 illustrates the fifth apparatus/server 55 illustrated in FIG. 2 in more detail. The server 55 comprises processing circuitry 52, transmitter circuitry 54, receiver circuitry 56 and a memory 58.

The processing circuitry 52 is configured to receive an input from the receiver circuitry 56, to provide an output to the transmitter circuitry 54, and to read from and write to the memory 58. The processing circuitry 12 is operationally coupled to the each element of circuitry 54, 56, 58 and any number or combination of intervening elements can exist (including no intervening elements).

The transmitter circuitry 54 is configured to transmit control data 28/53 to apparatuses. For example, the transmitter circuitry may be configured to transmit control data 28/53 to mobile apparatuses or telephones via cellular base stations. The control data may be a database 53 of position reference data 26 and/or instruction data 28. This is explained in more detail below.

The receiver circuitry 56 is configured to receive position reference data 26 from apparatuses. For example, the receiver circuitry 56 may be configured to receive position reference data 26 from mobile apparatuses or telephones via cellular base stations.

The comments made above with regard to the nature and form of the processing circuitry 12 and the memory 22 of the mobile apparatus 10 also apply to the processing circuitry 52 and the memory 58 of the server 55.

The memory 58 stores computer program instructions 57, position reference data 26 and instruction data 28. The computer program instructions 57 stored in the memory 58 control the operation of the server 55 when loaded into the processing circuitry 52. The processing circuitry 52 is, by reading the memory 58, able to load and execute the computer program instructions 57.

The computer program instructions 57 provide: a computer program, comprising: instructions for enabling an apparatus 10 to receive control data 28/53, the received control data 28/53 relating to controlling collection and/or transmission of position reference data 26 by the apparatus 10, the position reference data 26 being for assisting another apparatus to determine a position of the another apparatus based upon wireless signals received by the another apparatus; and instructions for enabling, in dependence upon the received control data 28/53, control of at least one of: collection of position reference data by the apparatus 10, and transmission, by the apparatus 10, of collected position reference data 26.

The computer program instructions 57 may arrive at the server 55 via any suitable delivery mechanism 49. The delivery mechanism 49 may be, for example, a computer-readable storage medium, a computer program product, a memory device, a record medium such as a CD-ROM or DVD, an article of manufacture that tangibly embodies the computer program 57. The delivery mechanism 49 may be a signal configured to reliably transfer the computer program 57. The server 55 may propagate or transmit the computer program 57 as a computer data signal.

Second, third and fourth methods for controlling the collection and upload of position reference data 26 by an apparatus 10 will now be described in reference to FIGS. 5, 6 and 7.

Figure 5:
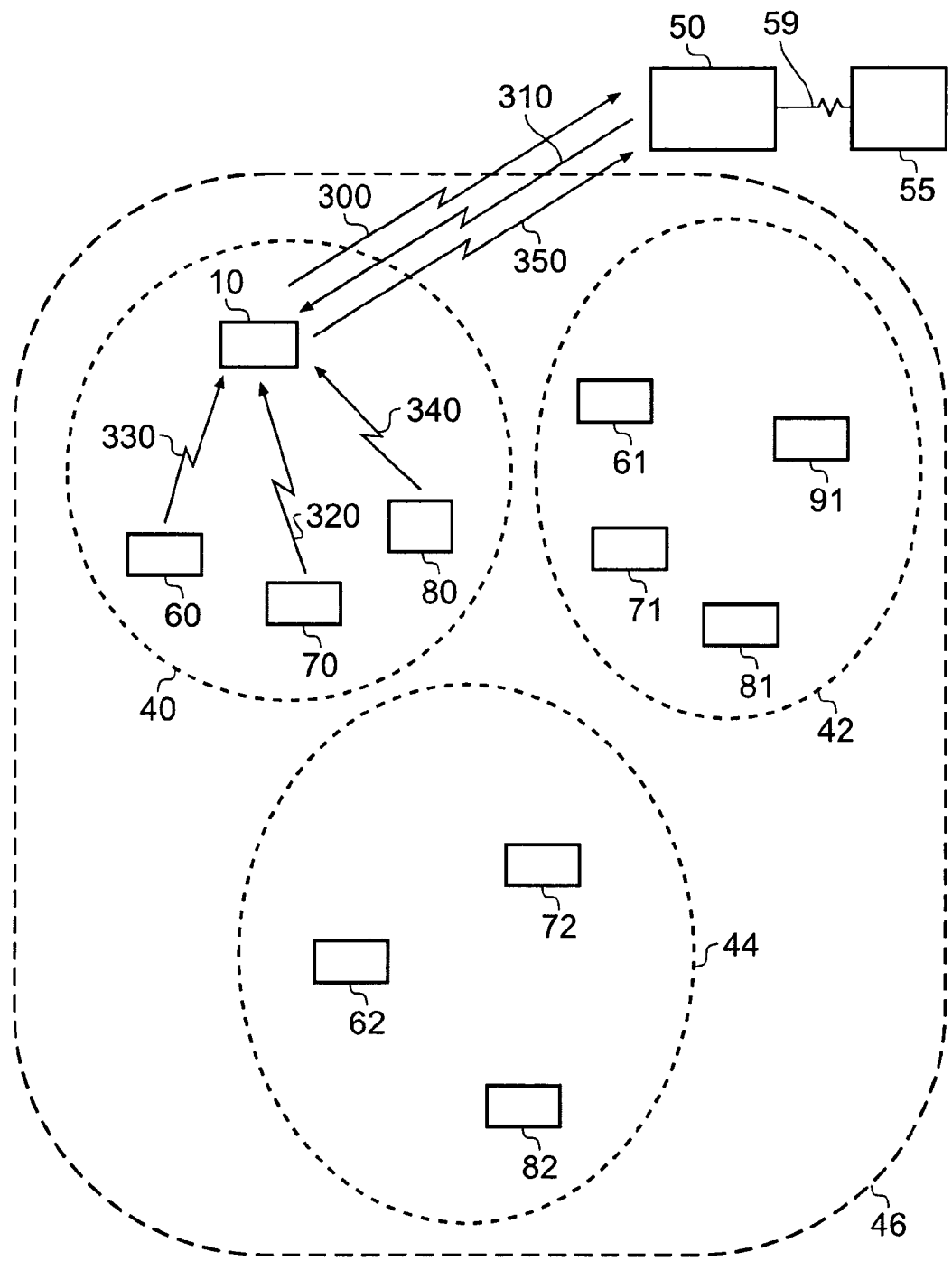
FIG. 5 illustrates communication between apparatuses.

FIG. 5 is similar to FIG. 2 in that it illustrates a first, second, third, fourth and fifth apparatuses 10, 50, 60, 70 and 55. As before, for clarity purposes, these apparatuses will be described below as being a mobile apparatus 10, a cellular base station 50, WLAN access points 60, 70 and a server 55 connected to the cellular base station 50 via a communication link 59.

FIG. 5 differs from FIG. 2 in that it illustrates the mobile apparatus 10 being located in a geographical macro-area 46. More specifically, the apparatus is located in a first geographical sub-area 40 located within the geographical macro-area 46. The geographical macro-area 46 also includes two other geographical sub-areas 42, 44. The second geographical sub-area includes four WLAN access points 61, 71, 81 and 91. The third geographical sub-area includes three WLAN access points 62, 72, 82.

In some embodiments of the invention, each of the geographical sub-areas 40, 42, 44 has its own cellular base station and the geographical sub-areas can be considered to be micro-cells of the cellular network. It may be that each of the geographical sub-areas 40, 42, 44 has more than one cellular base station. A further cellular base station may also service the whole of the geographical macro-area 46. In this case, the geographical macro-area 46 can be considered to be a macro-cell of the cellular network.

In FIG. 5, the cellular base station 50 and the server 55 are illustrated as being outside the geographical area 46 for clarity. However, in practice, the cellular base station 50 and/or the server 55 may or may not be situated inside the geographical area 46. For example, the cellular base station 50 may service the whole of the geographical area 46, just the first geographical sub-area 40, or just part of the first geographical sub-area 40.

Figure 6:
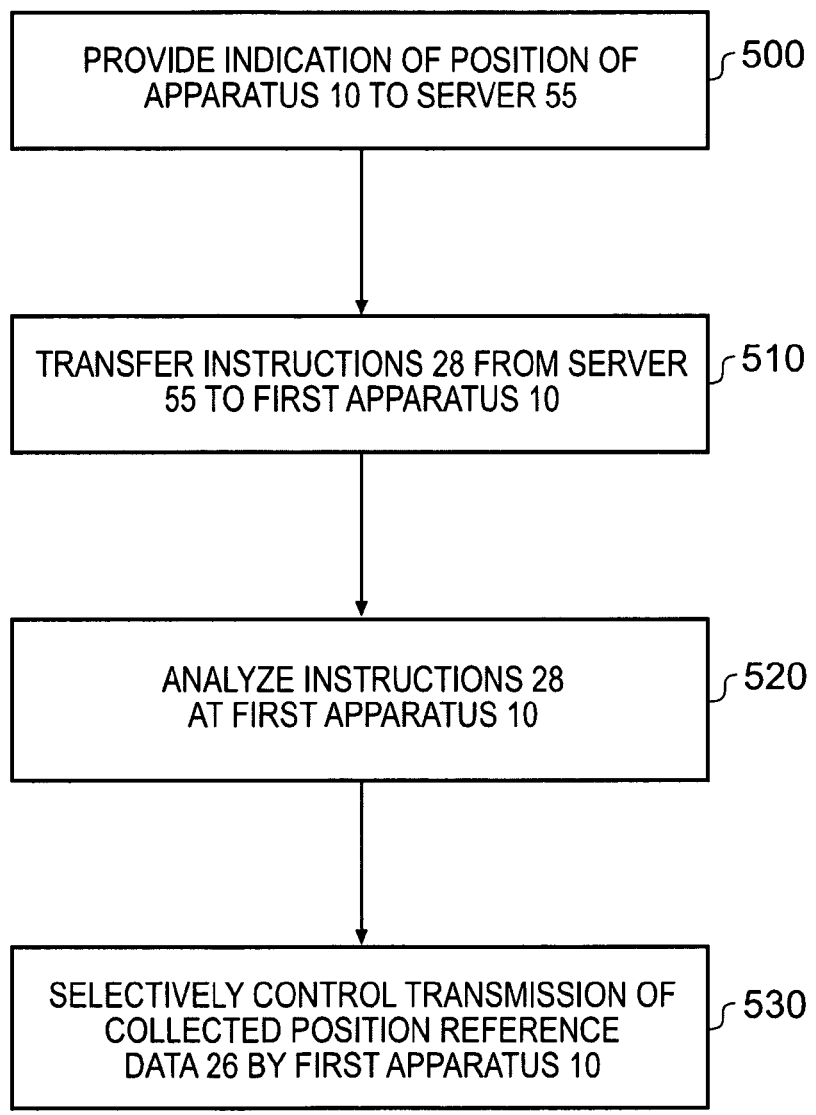
FIG. 6 illustrates a method of uploading position reference data to a server.

FIG. 6 illustrates a second method of controlling the collection and/or upload of position reference data 26 by a mobile apparatus 10.

The second method differs from the first method described above in that, at step 500 of FIG. 6, the processing circuitry 12 of the mobile apparatus 10 controls the transmitter circuitry 14 to transmit an indication of the mobile apparatus' position to the server 55.

For example, in one embodiment, positioning circuitry 20 of the mobile apparatus 10 may determine a position of the mobile apparatus 10, and the mobile apparatus 10 may then transmit the determined position to the server 55. FIG. 5 illustrates the determined position being sent in a first radio signal 300 by the mobile apparatus 10.

For instance, determined position may be an exact geographical location given by latitude and longitude measurements determined by a satellite positioning receiver. Alternatively, the indicated position may be a geographical area (e.g. a geographical area indicated by a code relating to a particular cellular network cell or cells).

In an alternative embodiment, the radio signal 300 may not include an indication of the determined position as data and instead the cellular base station 50 or the server 55 may determine the position of the mobile apparatus 10 by some other method (e.g. by using RSSI, by using time of flight measurements or by determining which cell of the cellular network the mobile apparatus 10 is located in).

In this second method, the memory 58 of the server 55 stores different portions of instruction data 28 for apparatuses (e.g. mobile telephones) that are located in different geographical sub-areas 40, 42, 44 within the geographical area 46. Once the position of the mobile apparatus 10 has been determined by the server 55 as being within the first geographical sub-area 40, the processing circuitry 52 of the server 55 retrieves the portion of instruction data 28 from the memory 52 that relates to the first geographical sub-area 40. The retrieved portion of instruction data 28 includes at least one parameter relating to collection and/or transmission of collected position reference data 26 by the mobile apparatus 10 in the first geographical sub-area 40.

The retrieved portion of instruction data 28 can be considered to be a form of "control data" (as mentioned earlier), because it comprises instructions that control the collection and/or transmission of position reference data by the mobile apparatus 10. The instructions explicitly indicate the manner in which the mobile apparatus 10 should collect and/or transmit position reference data 26 from WLAN access points.

The portion of instruction data 28 may, for example, include one or more of the following parameters:

i) a parameter that indicates a time or time period of the day at which position reference data 26 is to be collected and/or transmitted by the mobile apparatus 10;

ii) a parameter that indicates the frequency at which the mobile apparatus 10 is to collect position reference data and/or transmit position reference data;

iii) a parameter that indicates the minimum RSSI that must be measured for a signal received from an access point in order to collect position reference data 26 relating to that access point, otherwise position reference data is not collected;

iv) a parameter that defines the frequency at which position reference data 26 is collected and/or transmitted when satellite positioning circuitry of the mobile apparatus 10 is operational;

v) a parameter that indicates a desired property of position reference data 26 transmitted to the server 55, such as a parameter specifying a minimum accuracy level for a position indicated in position data 104 of position reference data 26 (e.g. specifying that the position must have been determined by a satellite positioning receiver)

vi) a parameter that indicates a minimum distance that the mobile apparatus 10 must move between collection of a first portion of position reference data 26 from a first access point and collection of a second portion of position reference data 26 from a second access point; and/or vii) a parameter that defines the amount of space in the memory 22 of the mobile apparatus 10 that is to be allocated to storing collected position reference data 26. In the event that this memory space becomes full, the mobile apparatus 10 either transmits the stored position reference data 26 to the server 55 or deletes some of it from the memory 22.

At step 510 of FIG. 6, the processing circuitry 52 of the server 55 controls the transmitter circuitry 54 to transmit a retrieved portion of instruction data 28 to the mobile apparatus 10, via the cellular base station 50. FIG. 5 illustrates the cellular base station 50 physically providing the retrieved portion of instruction data 28 to the mobile apparatus 10 as data in a second radio signal 310, in reply to the first radio signal 300. The second radio signal 310 is received by the receiver circuitry 16 of the mobile apparatus 10.

At step 520, the processing circuitry 12 of the mobile apparatus 10 analyzes the received portion of instruction data 28. At step 530, in dependence upon the analysis, the processing circuitry 12 selectively controls the transmission of collected position reference data 26 to the server 55, by either: i) controlling the way in which position reference data is collected by mobile apparatus 10, or ii) controlling the way in which collected position reference data 26 is transmitted to the server 55 (as explained in the first method in relation to FIG. 2).

In step 520, the processing circuitry 12 may, for example, analyze one or more of the parameters in relation to an operational characteristic of the mobile apparatus 10 (e.g. a current time setting for the mobile apparatus 10). For instance, consider a situation where the portion of instruction data 28 received by the mobile apparatus 10 includes a parameter that specifies that the mobile apparatus 10 is to collect position reference data 26 between 7 am and 11 am, but not at other times. The processing circuitry 12 analyzes the parameter in relation to the current time setting of the mobile apparatus 10. If the current time setting of the mobile apparatus 10 is between 7 am and 11 am, the processing circuitry 12 controls the collection circuitry 18 to collect position reference data 26. If the current time setting is not between 7 am and 11 am, the processing circuitry 12 does not control the collection circuitry to collect position reference data 26.

In other words, a decision process is carried out by the processing circuitry 12, a first result of which causes the processing circuitry 12 to control the collection circuitry 18 to collect position reference data 26, a second result of which causes the processing circuitry 12 not to control the collection circuitry 18 to collect position reference data 26.

FIG. 5 illustrates the mobile apparatus 10 collecting position reference data 26 from three WLAN access points 60, 70 and 80 via three separate radio signals 320, 330, 340. A portion 100 of position reference data 26 is collected using each radio signal 320, 330, 340. Once the position reference data 26 has been collected using the radio signals 320, 330, 340 from the WLAN access points 60, 70, 80, it is transmitted by the mobile apparatus 10 to the server 55 via the cellular base station 50.

FIG. 5 illustrates the mobile apparatus 10 transmitting the position reference data 26 to the server 55 via the cellular base station 50 using a third radio signal 350. The processing circuitry 52 of the server 55 stores the received position reference data 26 in its database 53.

In the second method, the server 55 may control, over time, when the mobile apparatus 10 provides an updated indication of its position to the server 55 (e.g. by including an appropriate parameter in the instruction data 28 transmitted to the mobile apparatus 10). This enables the server 55 to keep providing the mobile apparatus 10 with up-to-date instructions, based on its position.

The parameter may, for example, instruct the mobile apparatus 10 to provide an indication of its position: i) periodically, ii) when it has moved a certain distance from its earlier position, or iii) when it has moved from one geographical sub-area to another (e.g. from one cell of cellular network to another).

Advantageously, in the second method described in relation to FIG. 6, the server 55 is able to control the collection and/or transmission of position reference data 26 differently for different geographical areas. Once the server 55 has received an indication of the position of an apparatus, it may send instructions to it that are specifically tailored to that geographical area.

This enables the server 55 to control the amount of position reference data 26 that is transmitted in the cellular network. For example, if the server 55 has a sufficient amount of position reference data 26 for a particular geographical area, it may control apparatuses in that area to collect position reference data 26 less frequently and/or transmit position reference data 26 to it less frequently, reducing the load on the cellular network.

The server 55 is also able to instruct collecting apparatuses to focus on collecting and transmitting position reference data 26 in certain geographical areas, enabling it to fill in the gaps in its database 53.

A third method of controlling the collection and/or upload of position reference data 26 by a mobile apparatus 10 will now be described in relation to FIGS. 5 and 7.

The third method differs from the second method in a number of ways. Firstly, the mobile apparatus 10 does not necessarily transmit an indication of its position to the server 55 in a first radio signal 300.

Secondly, the server 55 does not provide instructions to the mobile apparatus 10 that relate only to collection and/or transmission of position reference data 26 at the mobile telephone's current position. Instead, the server 55 provides the mobile apparatus 10 with a plurality of different portions of instruction data 28, each portion relating to a different position (e.g. a different geographical sub-area). The mobile apparatus 10 determines which portion of instructions to use by determining its position (e.g. using the positioning circuitry 20) and then determining which portion of the received instruction data 28 relates to that position.

In more detail, in the third method, optionally, the apparatus 10 initially transmits a request to the server 55, asking to receive the database 53 of position reference data 26 stored in the memory 58 of the server 55. FIG. 5 illustrates the mobile apparatus 10 transmitting the request in the form of a first radio signal 300.

Figure 7:
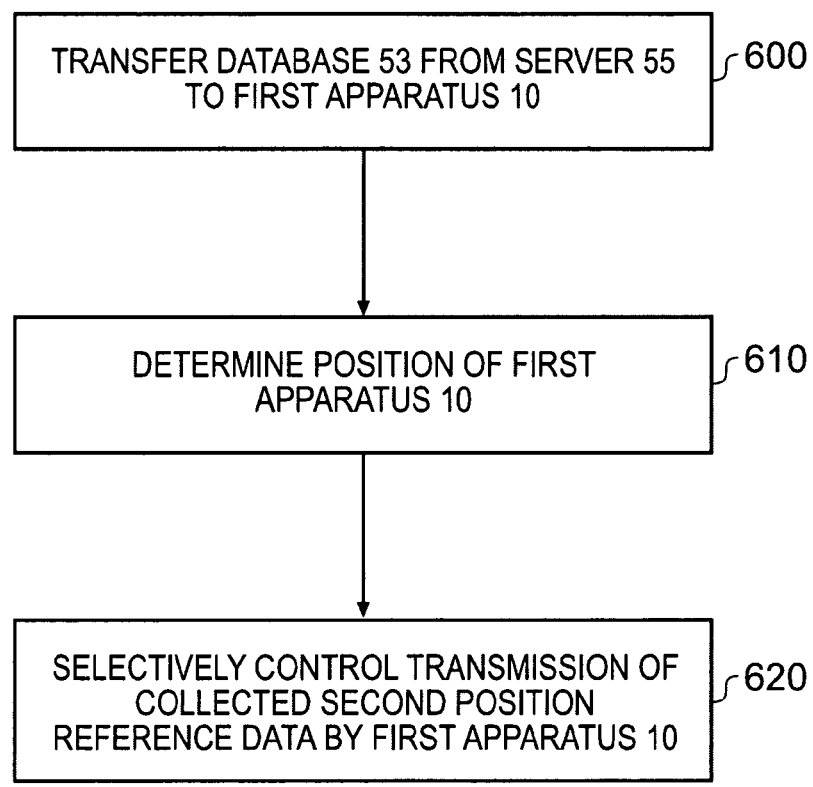
FIG. 7 illustrates a further method of uploading position reference data to a server.

In response receiving the request, at step 600 of FIG. 7, the processing circuitry 12 of the server 55 retrieves the database 53 of position reference data 26 from the memory 58 and controls the transmitter circuitry 54 to transmit it to mobile apparatus 10 via the cellular base station 50. Alternatively, the server 55 may transmit the database 53 to the mobile apparatus 10 without having received a request.

The server 55 also provides instruction data 28 to the mobile apparatus 10 with the database 53 that includes a first portion of instructions relating to collection and/or transmission of position reference data 26 by apparatuses the first geographical sub-area 40, a second portion of instructions that relate to collection and/or transmission of position reference data 26 by apparatuses the second geographical sub-area 42 and a third portion of instructions that relate to collection and/or transmission of position reference data 26 by apparatuses the third geographical sub-area.

The instruction data 28 may be transmitted as separate data to the database 53, or, alternatively, the instruction data 28 may be embedded within the database 53. Also, the database 53 and/or the instruction data 28 may be embedded in other data.

At step 610, the positioning circuitry 20 of the mobile apparatus 10 determines the position of the apparatus 10. The processing circuitry 12 analyzes the received instruction data 28 in relation to the determined position, in order to determine which portion of the received instruction data 28 relates to the position of the mobile apparatus 10.

In the example illustrated in FIG. 5, the mobile apparatus 10 is located in the first geographical sub-area 40. The processing circuitry 12 determines, using the position determined by the positioning circuitry 20, that the relevant portion of instructions are those relating to the first geographical sub-area 40. The processing circuitry 12 then analyzes those instructions and, at step 620 of FIG. 7, selectively controls the collection circuitry 18 to collect and/or transmit position reference data 26 in the first geographical sub-area 40 in accordance with those instructions. The selective control of collection and/or transmission of position reference data is similar to that previously described in relation to FIGS. 2 and 5.

A fourth method of controlling the collection and/or upload of position reference data 26 by an apparatus/mobile apparatus 10 will now be described in relation to FIG. 5.

The fourth method is similar to the third method in that a database 53 of position reference data 26 is transmitted to the mobile apparatus 10 by the server 55 (as explained above in relation to step 600 of FIG. 7).

However, the fourth method differs from the third method in that no instruction data 28 is sent to the mobile apparatus 10 along with the database 53. Instead, the processing circuitry 12 of the mobile apparatus 10 is configured to analyze the position reference data 26 in the received database 53 and to selectively control the collection circuitry 18 to collect and/or transmit position reference data in dependence upon the analysis.

For example, the processing circuitry 12 may determine from its analysis of the position reference data 26 in the database 53 that the database 53 already includes accurate portions 100 of position reference data 26 for some WLAN access points. The processing circuitry 12 may only control the collection circuitry 18 to collect portions of position reference data 26 for WLAN access points that are not already accurately represented in the database 53.

Also, the processing circuitry 12 may determine that the database 53 already contains a sufficient number of portions 100 of position reference data 26 in some geographical areas (e.g. the first geographical sub-area 40) but not in others (e.g. the second and third geographical sub-areas 42, 44). In this case, the processing circuitry 12 may control the collection circuitry 18 differently depending upon the location of the mobile apparatus 10 (e.g. to collect and transmit position reference data 26 less frequently when the mobile apparatus 10 is in the first geographical sub-area 40 than when it is in the second and third geographical sub-areas 42, 44).

In the fourth method, the database 53 of position reference data 26 that is provided to the mobile apparatus 10 by the server 55 can be considered to be "control data", because it implicitly indicates to the mobile apparatus 10 the manner in which it should collect and/or transmit position reference data 26.

Figure 8:
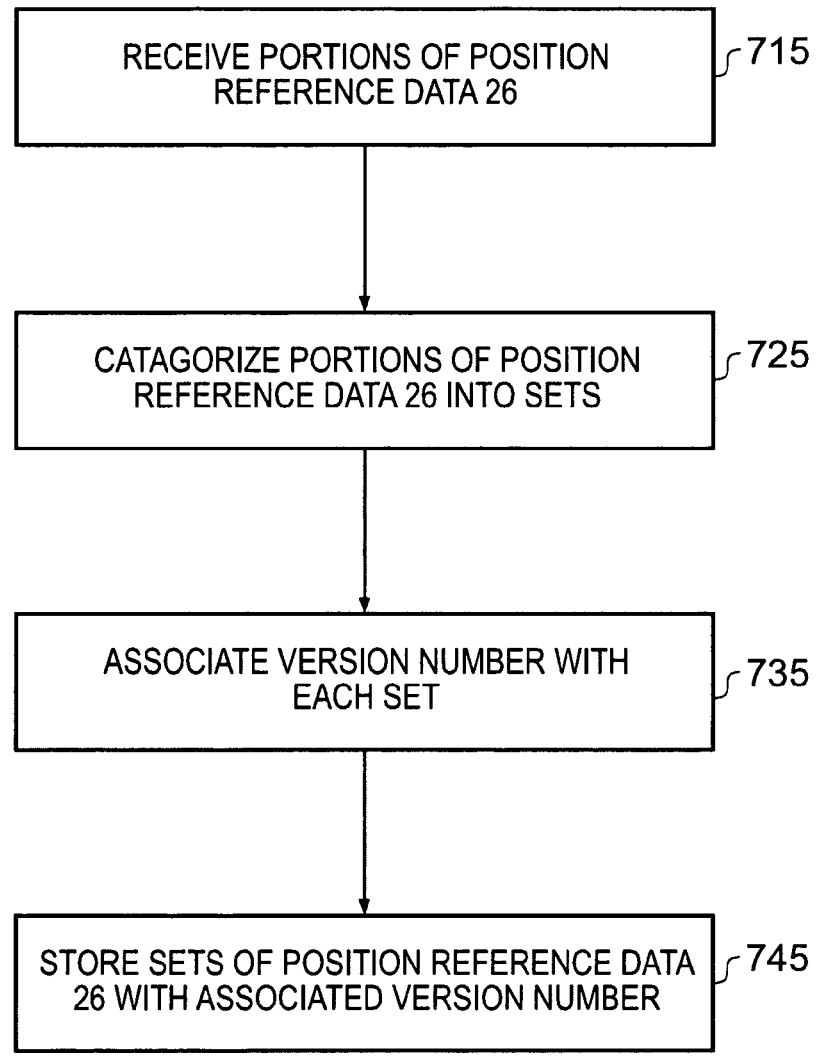
FIG. 8 illustrates a method of forming a database of position reference data and providing the database to an apparatus.

FIG. 8 illustrates a flow diagram of a method of uploading portions of position reference data 26 to the server 55 and forming a database 53 that includes the uploaded position reference data.

Figure 9:
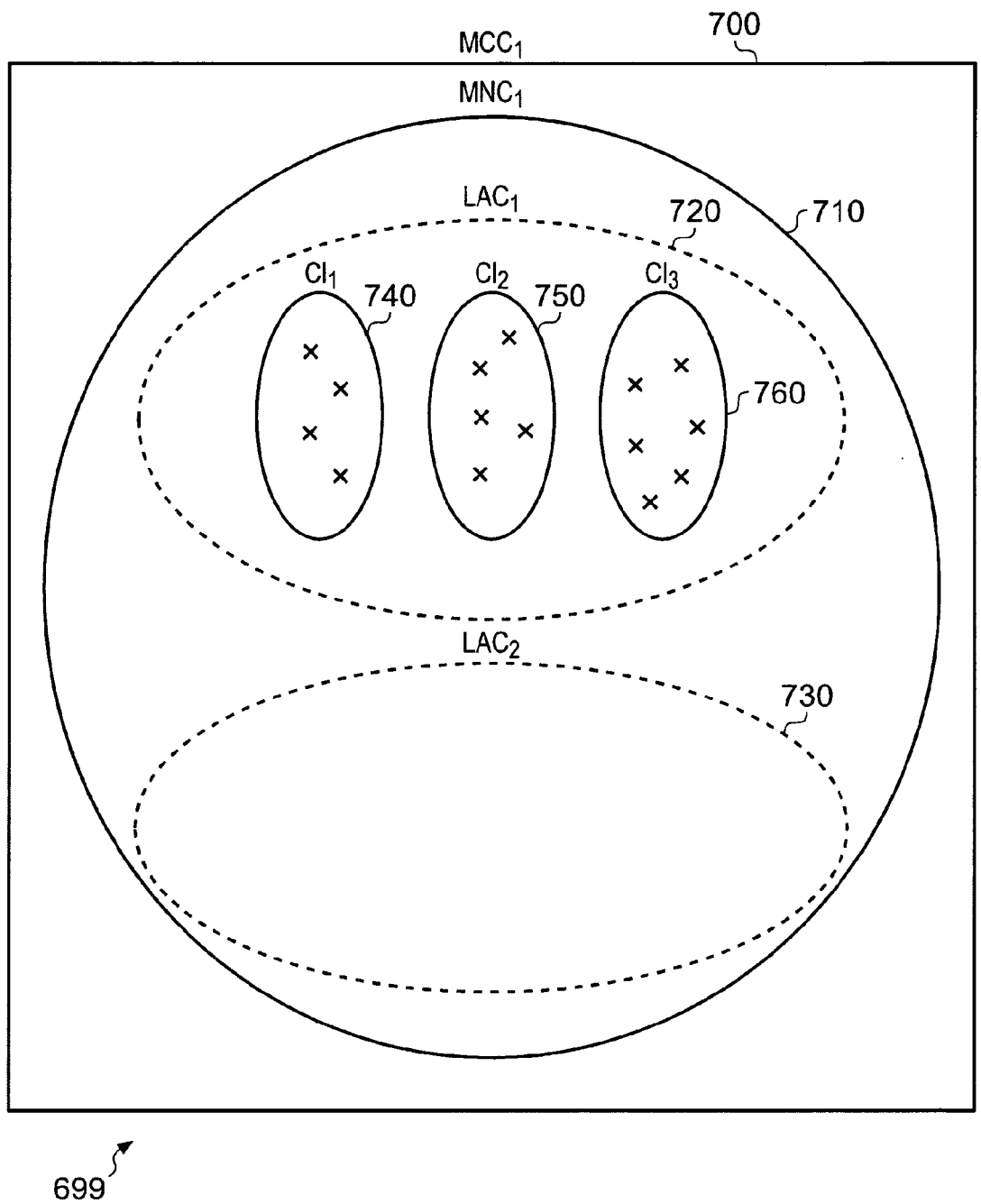
FIG. 9 illustrates a geographical schematic of the database.

FIG. 9 illustrates a schematic of a hierarchy 699 of a cellular telephone network. This particular network is a 2G network, but it will be apparent to those skilled in the art that embodiments of the invention relate to any type of cellular telephone network. The area encompassed by the rectangular box 700 represents the area of a country. The country 700 has a mobile country code $MCC_1$. The area encompassed by the line 710, located within the country $MCC_1$, represents the network coverage area of a cellular telephone network within the country. The cellular network has a mobile network code $MNC_1$.

In FIG. 9, the cellular network $MNC_1$ is split into first and second local areas. The dotted lines 720 and 730 illustrate the areas of coverage provided by the first and second local areas within the cellular network $MNC_1$. The first and second local areas have the codes $LAC_1$ and $LAC_2$ respectively, and can be considered to be geographical sub-areas of $MNC_1$. While only two local areas $LAC_1$, $LAC_2$ are illustrated in FIG. 9 for clarity, in practice, the cellular network $MNC_1$ is likely to have many more local areas. The aggregate area encompassed by the local areas would be equal to the coverage area provided by the cellular network $MNC_1$.

The first local area $LAC_1$ is illustrated as having first, second and third cells having the codes $CI_1$, $CI_2$ and $CI_3$ respectively. The cells $CI_1$, $CI_2$ and $CI_3$ can be considered to be geographical sub-areas of $LAC_1$.

No cells are illustrated in the second local area $LAC_2$. It will be appreciated that, in practice, the first local area $LAC_1$ may contain many more cells and the second local area $LAC_2$ may also contain a large number of cells. The aggregate area encompassed by the cells in a local area would be equal to the size of the local area.

At block 715 of FIG. 8, the receiver circuitry 56 of the server 55 receives a plurality of portions of position reference data 26 that have been uploaded by a plurality of apparatuses. Each portion 100 of position reference data 26 identifies the position of a WLAN access point within a cell in a local area of a cellular network. Each cross in FIG. 9 represents the location of a WLAN access point.

At step 725, the processing circuitry 12 of the server 52 categorizes the portions 100 of received position reference data 26 into sets. $MNC_1$ represents a first set (hereinafter the $MNC_1$ set). All of the WLAN access points are located within the area encompassed by $MNC_1$, so all of the WLAN access points are contained in the $MNC_1$ set.

$LAC_1$ and $LAC_2$ represent second and third sets (hereinafter the LAC1 and $LAC_2$ sets). The $LAC_1$ and $LAC_2$ sets are contained within the $MNC_1$ set. All of the WLAN access points in FIG. 1 are contained in the $LAC_1$ set. No WLAN access points are contained in the $LAC_2$ set.

$CI_1$, $CI_2$ and $CI_3$ represent fourth, fifth and six sets (hereinafter the $CI_1$, $CI_2$ and $CI_3$ sets). It can be seen from FIG. 9 that the $CI_1$ set contains four WLAN access points, the $CI_2$ set contains five WLAN access points and the $CI_3$ set contains six WLAN access points.

At step 735 of FIG. 8, a version number is associated with each set. For example, when the database 53 is initially formed, each of the sets MCC1, $MNC_1$, $LAC_1$, $LAC_2$, $CI_1$, $CI_2$ and $CI_3$ may be associated with the version number 1.

At step 745, the processing circuitry 52 stores the sets of position reference data 26 and their associated version numbers as data in the memory 58.

Figure 10:
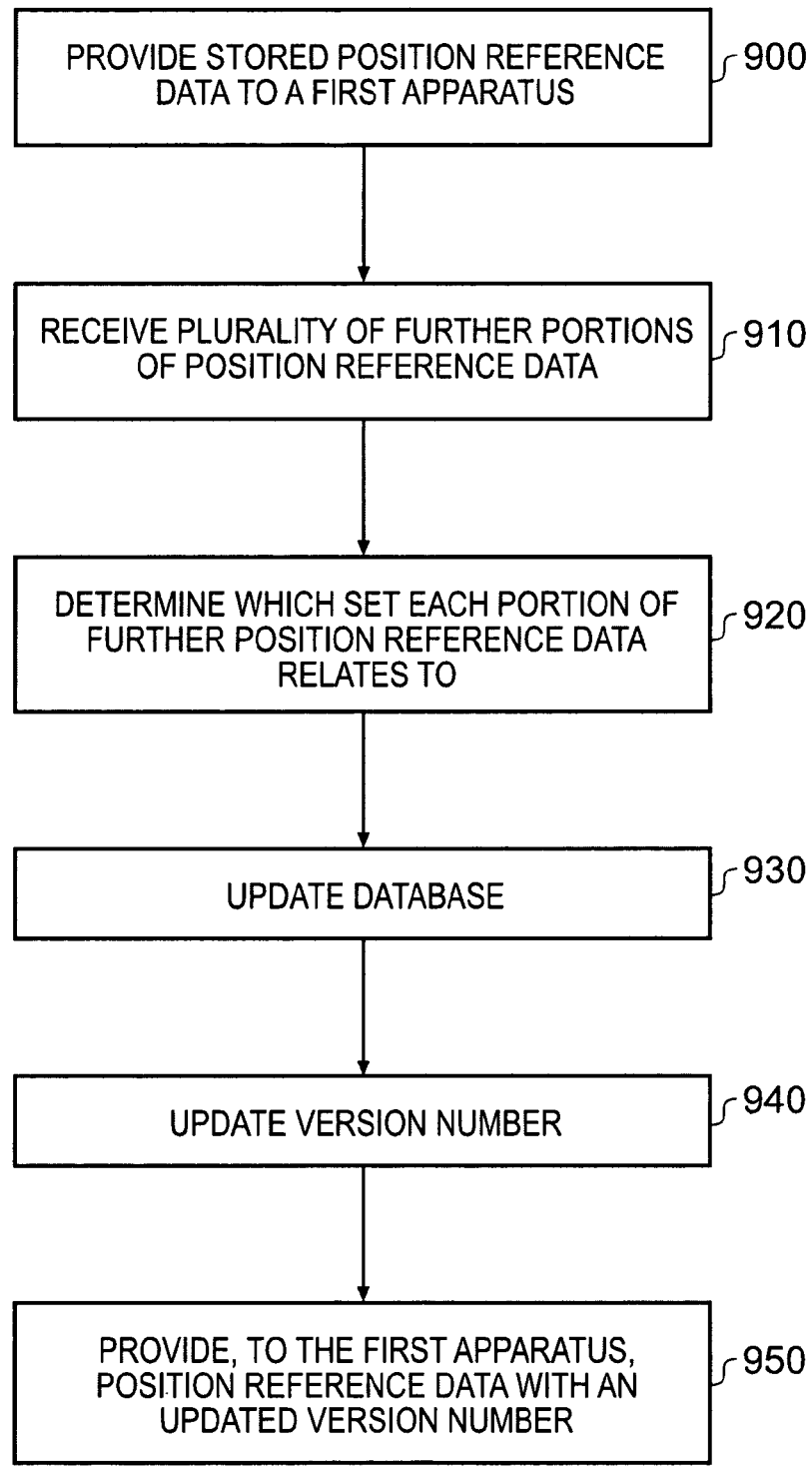
FIG. 10 illustrates a method of updating the database and providing the updated database to an apparatus.

FIG. 10 illustrates a method of providing a database of position reference data 26 to a mobile apparatus 10.

At step 900 of FIG. 10, the processing circuitry 52 of the server 55 retrieves the database 53 of position reference data 26 from the memory 58 and controls the transmitter circuitry 54 to provide it to the mobile apparatus 10. In some embodiments of the invention, only a portion of the database 53 is provided to the mobile apparatus 10. The database 53 enables the user of the mobile apparatus 10 to identify the location of WLAN access points.

Instruction data 28 that comprises instructions which control the collection and/or transmission of position reference data by the mobile apparatus 10 (as described above in relation to FIG. 6) may or may not be transmitted to the mobile apparatus 10 along with the database 53.

The instruction data 28 may be transmitted as separate data to the database 53, or, alternatively, the instruction data 28 may be embedded within the database 53. Also, the database 53 and/or the instruction data 28 may be embedded in other data.

In a situation where a new WLAN access point is positioned in the area encompassed by the cell $CI_1$ and the position of an existing WLAN access point in $CI_2$ is changed, at step 910 of FIG. 10, further portions 100 of position reference data 26 are uploaded to the server 55 by one or more apparatuses. A first portion of the position reference data 26 relates to the new WLAN access point in $CI_1$. A second position of the position reference data 26 relates to the new position of the moved WLAN access point in $CI_2$. These portions of the position reference data 26 are received by the receiver circuitry 56 of the server 55.

At step 920 of FIG. 10, the processing circuitry 52 of the server 55 determines which sets the received portions of further position reference data 26 relate to. The processing circuitry 52 determines, from the first portion of further position reference data 26, that the new WLAN access point is positioned in the areas encompassed by $MCC_1$, $MNC_1$, $LAC_1$ and $CI_1$. The processing circuitry 52 also determines, from the second portion of further position reference data, that the new location of the moved WLAN access point is within the areas $MCC_1$, $MNC_1$, $LAC_1$ and $CI_2$.

At step 930, the processing circuitry 12 updates the database 53 stored in the memory 58 using the received first and second portions of further position reference data 26. That is, the first portion of further position reference data relating to the new WLAN access point is added to the $MCC_1$, $MNC_1$, $LAC_1$ and $CI_1$ sets. The processing circuitry 12 determines, by comparing the identification code in the second portion of position reference data with those already stored in the database 53, that a portion of position reference data 26 already exists for the moved WLAN access point. It determines that the exiting portion of position reference data relates to a different location to that indicated in the second portion of further position reference data. The processing circuitry 52 then updates the database with the new position information from the second portion of further position reference data.

Figure 11:
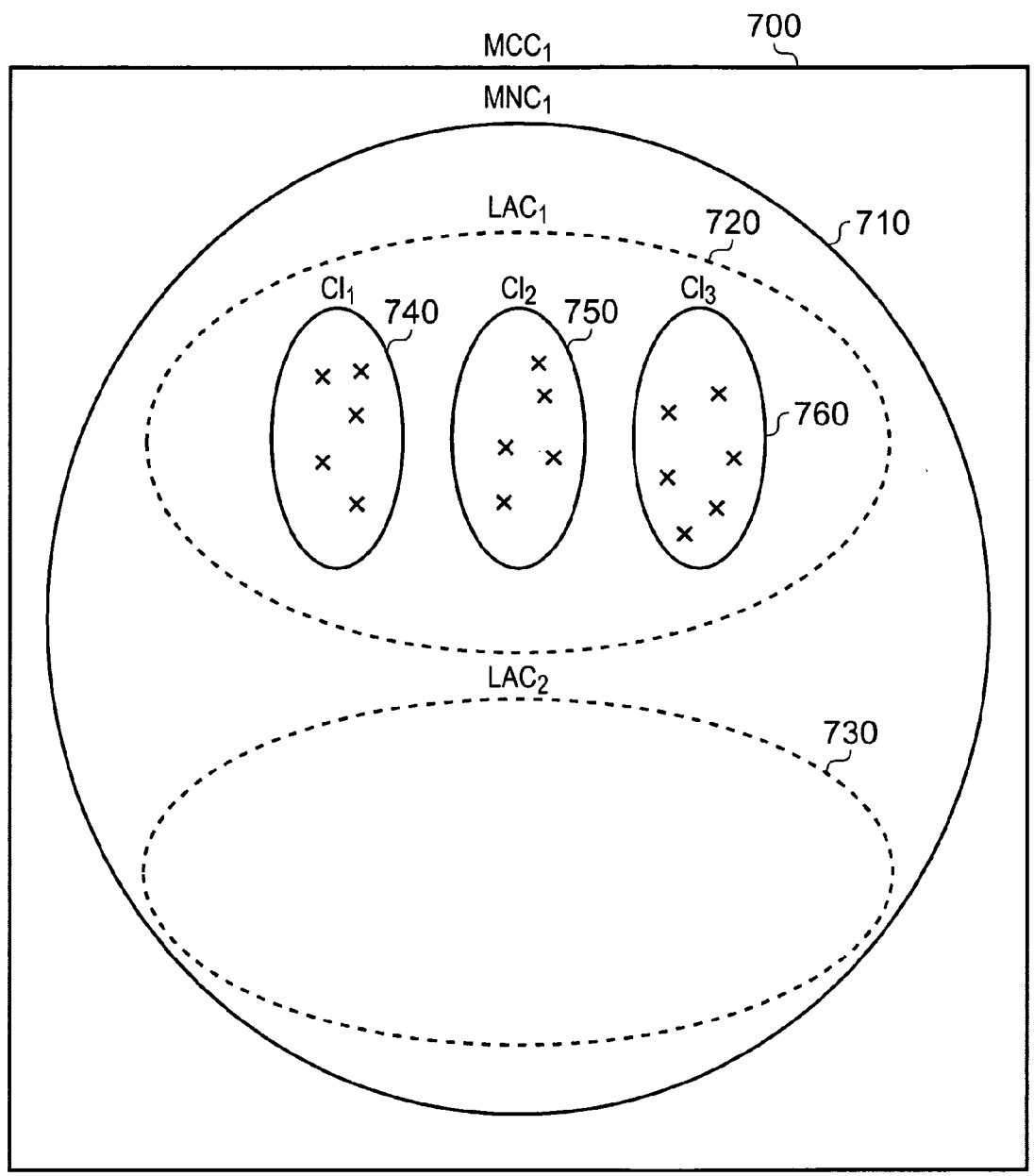
FIG. 11 illustrates a geographical schematic of the updated database.

FIG. 11 illustrates a schematic of the updated database 53. By comparing FIG. 11 with FIG. 9, it can be seen that the $CI_1$ set includes a new WLAN access point and the location of an existing WLAN access point the $CI_2$ set has changed.

At step 940 of FIG. 10, the processing circuitry 12 updates the version numbers associated with the sets that have been updated with the first and second portions of further position reference data. The $MCC_1$, $MNC_1$, $LAC_1$, $CI_1$ and $CI_2$ sets were updated in step 930, so these sets are given the version number 2. The sets $CI_3$ and $LAC_2$ were not updated in step 930, so the version number for these sets remains at 1.

At step 950 of FIG. 10, mobile apparatus 10 transmits a signal to the server, via a cellular base station, to request an update to the mobile apparatus' stored database of position reference data 26. The request may indicate which sets of position reference data are stored in the mobile apparatus' database and which version number each set has. In this example, the mobile apparatus 10 has a database corresponding to that in FIG. 9 and each of the sets has a version number equal to 1.

The processing circuitry 52 of the server 55 analyzes the request made by the apparatus 10 and determines that the server's database 53 contains more up-to date position reference data for the $MCC_1$, $MNC_1$, $LAC_1$, $CI_1$ and $CI_2$ sets than the mobile apparatus' database. The processing circuitry 52 then controls the transmitter circuitry 54 to transmit position reference data 26 for these sets to the mobile apparatus 10. The position reference data for the $CI_3$ and $LAC_2$ sets is not provided by the server 55 to the mobile apparatus 10, because database 53 of the server 55 and the database of the mobile apparatus 10 contain the same position reference data for these sets.

In embodiments of the present invention, a server need not update the whole of an apparatus' stored database of position reference data each time an update is requested by the apparatus. Advantageously, only updated portions of the server's database 53 are provided to the apparatus, reducing the amount of bandwidth that would otherwise be required to update the apparatus's stored database.

The blocks illustrated in the FIGS. 6, 7, 8 and 10 may represent steps in a method and/or sections of code in the computer program 24, 57. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, in the embodiments of the invention described above, the apparatus 50 is described as being a cellular base station, and the communication access points 60, 61, 62, 70, 71, 72, 80, 81, 82, 92 are described as being WLAN access points.

However, in other embodiments of the invention, this need not be the case. For example, the apparatus 10 could be a personal music player or a laptop computer and the communication access points 50, 60, 61, 62, 70, 71, 72, 80, 81, 82, 92 could operate using a different communications protocol to cellular and WLAN. For example, all of the communication access points 50, 60, 61, 62, 70, 71, 72, 80, 81, 82, 92 could be Bluetooth access points.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus, comprising:
  processing circuitry;
  at least one memory storing computer program instructions that, when executed by the processing circuitry, cause at least the following to be performed:
  analyzing received control data indicating one or more geographical areas in which to perform at least one of collection of position reference data or transmission of collected position reference data, wherein the position reference data is configured to assist another apparatus to determine a position of the another apparatus based at least in part upon wireless signals received by the another apparatus, wherein the position reference data provides an indication of the location of at least one communication access point; and
  controlling, based at least in part upon the position of the apparatus and the analysis of the received control data in relation to the one or more geographical areas, at least one of: whether position reference data is collected by the apparatus and whether collected position reference data is transmitted by the apparatus.

2. An apparatus as claimed in claim 1, wherein analyzing the received control data further comprises analyzing at least one further parameter of the control data.

3. An apparatus as claimed in claim 2, wherein the at least one further parameter indicates at least one property of collected position reference data; and at least one of: collection of position reference data having the property and transmission of collected position reference data having the property is controlled.

4. An apparatus as claimed in claim 2, wherein the at least one further parameter indicates a frequency at which collected position reference data is to be one or more of collected or transmitted; and at least one of: collection of position reference data and transmission of collected position reference data is controlled according to the indicated frequency.

5. An apparatus as claimed in claim 2, wherein the at least one further parameter is analyzed in relation to at least one operational characteristic of the apparatus; and at least one of: collection of position reference data and transmission of collected position reference data is controlled based at least in part upon the analysis.

6. An apparatus as claimed in claim 5, wherein the at least one further parameter relates to a time or time period for controlling when collected position reference data is transmitted, and the operational characteristic of the apparatus relates to a current time or time period.

7. An apparatus as claimed in claim 1, wherein the received control data comprises received position reference data relating to a first geographical area and being for assisting the apparatus to determine a position of the apparatus within the first geographical area; and wherein at least one of: collection of position reference data in the first geographical area and transmission position reference data is controlled based at least in part upon the determined position of the apparatus and the received position reference data relating to the first geographical area.

8. A method, comprising:
analyzing, at an apparatus, received control data indicating one or more geographical areas in which to perform at least one of collection of position reference data or transmission of collected position reference data, the position reference data being configured to assist another apparatus to determine a position of the another apparatus based at least in part upon wireless signals received by the another apparatus, wherein the position reference data provides an indication of the location of at least one communication access point; and
controlling, at the apparatus, based at least in part upon the position of the apparatus and the analysis of the received control data in relation to the one or more geographical areas, at least one of: whether position reference data is collected by the apparatus and whether collected position reference data is transmitted by the apparatus.

9. A method as claimed in claim 8, wherein analyzing received control data further comprises analyzing at least one further parameter of the control data.

10. A method as claimed in claim 9, wherein the at least one further parameter indicates at least one property of collected position reference data; and at least one of: collection of position reference data having the property and transmission of collected position reference data having the property is controlled.

11. A method as claimed in claim 9, wherein the at least one further parameter indicates a frequency at which position reference data is to be one or more of collected or transmitted; and at least one of: collection of position reference data and transmission of collected position reference data is controlled in accordance with the indicated frequency.

12. A method as claimed in claim 9, wherein the at least one further parameter is analyzed in relation to at least one operational characteristic of the apparatus; and at least one of: collection of position reference data and transmission of collected position reference data is controlled based at least in part upon the analysis.

13. A method as claimed in claim 12, wherein the at least one further parameter relates to a time or time period for controlling when collected position reference data is transmitted, and the operational characteristic of the apparatus relates to a current time or time period.

14. A non-transitory computer readable medium storing computer program instructions that, when executed by processing circuitry, cause at least the following to be performed:
analyzing, at an apparatus, received control data indicating one or more geographical areas in which to perform at least one of collection of position reference data or transmission of collected position reference data, the position reference data being configured to assist another apparatus to determine a position of the another apparatus based at least in part upon wireless signals received by the another apparatus, wherein the position reference data provides an indication of the location of at least one communication access point; and
controlling, at the apparatus, based at least in part upon the position of the apparatus and the analysis of the received control data in relation to the one or more geographical areas, at least one of: whether position reference data is collected by the apparatus and whether collected position reference data is transmitted by the apparatus.

15. A non-transitory computer readable medium as claimed in claim 14, wherein analyzing the received control data comprises analyzing at least one further parameter of the control data.

16. A non-transitory computer readable medium as claimed in claim 15, wherein the at least one further parameter is analyzed in relation to at least one operational characteristic of the apparatus; and at least one of: collection of position reference data and transmission of collected position reference data is controlled based at least in part upon the analysis.

17. An apparatus as claimed in claim 1, wherein the control data relates to one or more of controlling collection of position reference data by the apparatus transmission of collected position reference data by the apparatus.

18. An apparatus as claimed in claim 1, further comprising:
transmitter circuitry configured to transmit collected position reference data.

19. An apparatus as claimed in claim 1, wherein the apparatus is a hand portable electronic apparatus.

* * * * *

UNITED STATES PATENT AND TRADEMARK OFFICE
CERTIFICATE OF CORRECTION

PATENT NO.       : 8,515,448 B2                          Page 1 of 1
APPLICATION NO. : 13/122855
DATED            : August 20, 2013
INVENTOR(S)      : Laine et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 97 days.

Signed and Sealed this

Fifteenth Day of September, 2015

Michelle K. Lee
*Director of the United States Patent and Trademark Office*